United States Patent [19]

Nevin

[11] Patent Number: 5,357,257
[45] Date of Patent: Oct. 18, 1994

[54] APPARATUS AND METHOD FOR EQUALIZING CHANNELS IN A MULTI-CHANNEL COMMUNICATION SYSTEM

[75] Inventor: Robert L. Nevin, Schenectady, N.Y.

[73] Assignee: General Electric Company, Schenectady, N.Y.

[21] Appl. No.: 43,080

[22] Filed: Apr. 5, 1993

[51] Int. Cl.⁵ .............................................. G01S 7/40
[52] U.S. Cl. .................................. 342/165; 342/173; 342/379
[58] Field of Search ............... 342/165, 173, 379, 380, 342/381, 382, 383, 384, 17, 19

[56] References Cited

U.S. PATENT DOCUMENTS

| 4,005,426 | 1/1977 | White | 342/379 |
|---|---|---|---|
| 4,780,721 | 10/1988 | Dobson | 342/178 |
| 5,214,675 | 5/1993 | Mueller et al. | 375/94 |

OTHER PUBLICATIONS

Pohlig, S. C., "Digital Signal Processing for Space--Based Radar", Project Report SRT-30, Lincoln Laboratory, Lexington, Mass., Sep. 1988.

*Primary Examiner*—Mark Hellner
*Attorney, Agent, or Firm*—Marvin Snyder

[57] ABSTRACT

A multi-channel electronic communication system with equalized channels comprises a reference channel and a plurality of object channels. A white noise excitation signal is injected into each channel. Each of the channels is sampled and, for each channel, the resultant samples are windowed and the windowed samples are Fast Fourier Transformed from the time domain to the frequency domain. Power spectral density estimates are determined for each object channel from the windowed samples in that channel. Cross-spectral density estimates for each object channel with respect to the reference channel are determined from the windowed samples in that object channel and the windowed samples in the reference channel. The power spectral density estimates are divided by the cross-spectral density estimates to derive correlation ratios which are converted back to the time domain to specify a corrective equalization filter weight vector for each object channel. An equalization filter in each object channel is then programmed with a respective filter weight vector specified by the corresponding correlation ratio and an equalization filter in the reference channel is programmed with a unity weight vector to equalize the channels in the system.

23 Claims, 3 Drawing Sheets

APPARATUS AND METHOD FOR EQUALIZING CHANNELS IN A MULTI-CHANNEL COMMUNICATION SYSTEM

BACKGROUND OF THE INVENTION

This invention relates in general to multi-channel communication systems and, more particularly, to equalization of the channels within such multi-channel communication systems.

It is often desirable for the individual channels in a multi-channel communication system to be matched with one another as closely as possible. Mismatched channels are known to significantly degrade performance in several applications. For example, multi-channel radar systems which employ adaptive cancellation techniques to substantially reduce electronic interference are adversely affected by channel mismatching. Such adaptive cancellation in the spatial domain uses a weighted sum of channel output signals wherein the weights are adaptively computed to form spatial nulls in the directions of arrival of interference signals. In this manner, the undesired effects of the interfering signals are significantly ameliorated. This adaptive cancellation technique is also referred to as adaptive beamforming.

The depth of the null achieved in adaptive cancellation determines the degree of rejection of interference. The maximization of null depth has become increasingly important in communication applications such as radar systems where rejection of interference is critical. Unfortunately, when a null is formed by the weighted sum of several channels, as is the conventional practice, the depth of the null is limited by mismatching of the characteristics of the channels. If the mismatch among the channels is caused by the overall phase shift and/or variations in the gain of the various channels, then the adaptive weighting algorithm employed in the adaptive cancellation technique should compensate for this. However, this compensation is inherently limited by the degree to which the phase shift and gain characteristics of the individual channels track each other across the signal bandwidth. Adaptive cancellation of these sub-band variations can be achieved. Unfortunately however, to accomplish such adaptive cancellation, a prohibitively large increase in adaptive weighting complexity and adaptation time is typically required.

One approach to solving this problem is to provide channels which are matched to the appropriate level prior to commencing adaptive processing. However, beyond certain matching levels, the expense of fabricating such matched channel again becomes prohibitive. Even if such an extremely expensive approach is successfully implemented, the resulting matched channel apparatus is subject to the de-matching effects of temperature variations and component aging.

A number of methods of sub-band mismatch calibration have been tried in an effort to address the problems discussed above. For example, Pohlig in his publication, Pohlig, S. C., "Digital Signal Processing For Spaced-Based Radar", Project Report SRT-30, Lincoln Laboratory, Lexington, Mass., September 1988, discusses three methods for measurement and equalization of sub-band mismatch. Pohlig's first method involves measuring the frequency responses of a reference channel, $H_0(\omega)$, and a number of object channels, $H_i(\omega)$, by sequentially injecting single-tone test signals at equally spaced frequencies and measuring the phase and gain of each channel at each frequency. The frequency spacing must meet some minimum based on the length of the expected correlation response of the channel. The span of frequencies must cover the interval over which sub-band balance is required. The frequency responses are transformed into autocorrelation and cross correlation sequences in the time domain. The autocorrelation and cross correlation sequences in the time domain are formed into matrix equations which are then solved for the equalizing filter impulse responses.

Pohlig discloses a second approach wherein white noise is injected into all channels of a multi-channel system including both the reference channel and the object channels. At predetermined intervals, a single sample, $x_0(n_0)$, is collected from the output of the reference channel while a sequence of $N_g$ samples, $x_i(0 \ldots N_g-1)$ is collected from each object channel. Several iterations of this process result in data samples which are processed into the autocorrelation and cross correlation function estimates. As with the Pohlig method first discussed above, this method also requires that the autocorrelation and cross correlation functions be placed in matrix form and solved for the equalizing filter impulse responses, $g_i$.

Pohlig also discusses a third approach which is similar to the second approach except that the excitation signal which is injected into the reference channel and the object channels is a simultaneous composite of the multiple tones used in the first approach rather than a white noise signal.

Unfortunately, each of the three approaches discussed above depend on matrix inversion techniques which consume vast quantities of computational resources. This tends to make implementation of such sub-band mismatch calibration methods very slow. Moreover, additional computational difficulties may be encountered in the second approach because there is no guarantee that the resultant matrix will be well-behaved in the mathematical sense.

SUMMARY OF THE INVENTION

Accordingly, one object of the present invention is to provide an improved apparatus and method for equalizing the channels in a multi-channel electronic system which requires matched phase and amplitude response over significant signal bandwidth among multiple receiving channels.

Another object of the present invention is to provide an apparatus and method for equalizing the channels in a multi-channel communication system which does not depend on matrix inversion techniques.

Yet another object of the present invention is to provide an apparatus and method for equalizing the channels in a multi-channel communication system which is sufficiently fast that the equalization of the channels can be frequently updated while the system is being used.

Still another object of the present invention is to provide an apparatus and method for equalizing the channels in a multi-channel communication system which does not impose a severe drain on computational resources.

In accordance with one embodiment of the present invention, an apparatus is provided for equalizing a reference channel and at least one object channel in a communication system. The apparatus includes a reference channel receiver for receiving the reference channel and an object channel receiver for receiving the object channel. The apparatus also includes a white noise generator coupled to the reference channel receiver and the object channel receiver. A reference channel sampling circuit is coupled to the reference channel receiver to produce reference channel sampled signals, and an object channel sampling circuit is coupled to the object channel receiver to produce object channel sampled signals. A power spectral density estimate determining circuit is coupled to the reference channel sampling circuit and the object channel sampling circuit for determining power spectral density estimates from the object channel sampled signals. A cross-spectral density estimate determining circuit is coupled to the reference channel sampling circuit and the object channel sampling circuit for determining cross-spectral density estimates in the object channel with respect to the reference channel from the reference channel sampled signals and the object channel sampled signals. A divider, coupled to the spectral density estimate determining circuit and the cross-spectral density estimate determining circuit, divides the power spectral density estimates by the cross-spectral density estimates to derive a correlation ratio which specifies an equalization filter weight vector. The apparatus also includes an equalization filter, situated in the object channel, for filtering the object channel as specified by the equalization filter weight vector to equalize the object channel with respect to the reference channel.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
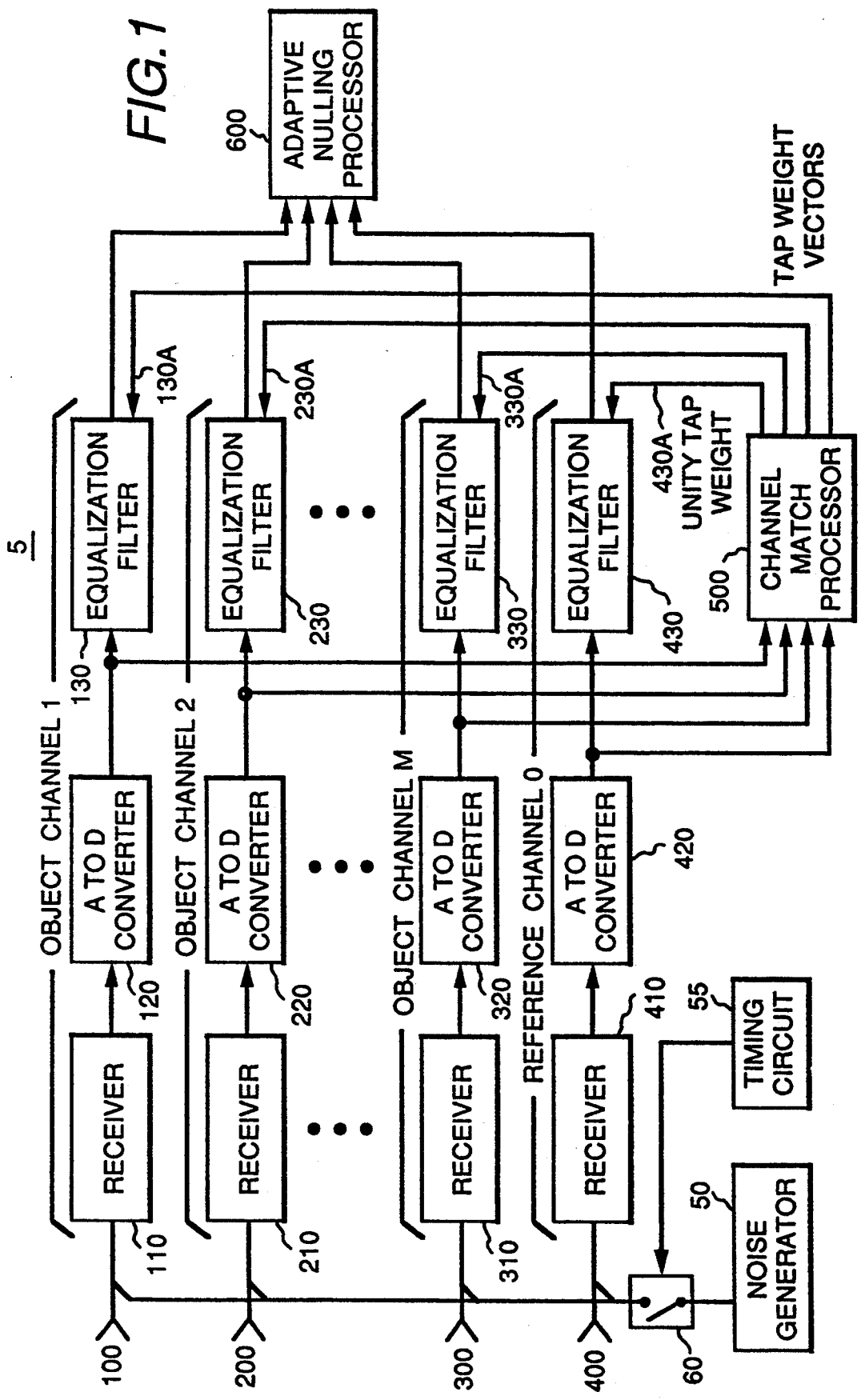
FIG. 1 is a block diagram of a multi-channel electronic communication system employing the equalization technique of the present invention.

FIG. 1 shows a multi-channel electronic system 5 in which the channels thereof are equalized as per the teachings of the present invention. System 5 includes channel inputs 100, 200, 300 and 400 which respectively correspond to the inputs of object channel 1, object channel 2, object channel M and a reference channel 0. A white noise generator 50 is coupled to channel inputs 100, 200, 300 and 400 via a switch 60 such that a white noise signal can be simultaneously gated on and off to all channel inputs as instructed by a timing circuit 55.

Object channel 1 includes a receiver 110 with its input coupled to input 100. The output of receiver 110 is coupled to the input of an analog to digital (A to D) converter 120 for sampling the signal received by receiver 110 and providing the resultant samples to an equalization filter 130 and to a channel match processor 500. The characteristics of equalization filter 130 can be changed in accordance with a set of tap weights (tap weight vector) provided to the weighting input 130A thereof by channel match processor 500 as discussed later.

Object channel 2 includes a receiver 210, an A to D converter 220 and an equalization filter 230 which are all substantially identical to the respective corresponding components of object channel 1. Object channel M also includes a receiver 310, an A to D converter 320 and an equalization filter 330, which are all substantially identical to the respective corresponding components of object channels 1 and 2.

Reference channel 0 includes a receiver 410, an A to D converter 420 and an equalization filter 430 which are substantially identical to the respective corresponding components of channels 1, 2 and N, except that filter 430 employs a unity gain tap as discussed later in more detail.

The outputs of A to D converters 120, 220, 320 and 420 are coupled to respective inputs of channel match processor 500 such that samples from object channels 1, 2 and M and from reference channel 0 are simultaneously provided to channel match processor 500. Channel match processor 500 calculates tap weight vectors for each of channels 1, 2, M and 0 which are provided to the weighting inputs 130A, 230A, 330A and 430A of the equalization filters in the respective channels. The tap weight vectors calculated by channel match processor 500 exhibit the appropriate values such that when equalization filters 130, 230, 330 and 430 assume the characteristics specified by the respective tap weight vectors, object channels 1, 2, M and reference channel 0 are then equalized.

The outputs of equalization filters 130, 230, 330 and 430 form the equalized outputs of channels 1, 2, M and 0, respectively. These outputs of channels 1, 2, M and 0 are coupled to the input of a conventional adaptive nulling processor 600 as shown. In one embodiment of the invention wherein the equalizing apparatus of the present invention is employed in a multi-channel radar system, the output of nulling processor 600 is generally coupled to a receiving array which is designed for adaptive beamforming applications in conjunction with nulling processor 600. Conventional adaptive nulling processors such as processor 600 generate the appropriate weighted sum of its input signals to effect the desired interference cancellation when coupled to additional radar signal processing stages not shown here.

To fully discuss the data collecting and processing activities carried out by channel match processor 500 to achieve channel matching, it is first helpful to define two quantities, namely, the equalization bandwidth, $B_e$, and the equalization response time, $T_e$. The equalization bandwidth, $B_e$, is the two-sided bandwidth over which the uncorrected outputs of two channels might have differences exceeding the mismatch tolerance. It has been found that the equalization bandwidth, $B_e$, can generally be safely defined by requiring that input energy outside the $B_e$ interval be attenuated to below the mismatch tolerance for each channel. The equalization response time, $T_e$, is the maximum expected correlation time of the mismatch and can generally be safely assumed to be no greater than the maximum duration of each channel's impulse response. It is noted that for these parameters, namely the equalization bandwidth $B_e$, and the equalization response time $T_e$, to be known, the limits of the errors for which the equalization system of the invention is trying to correct must also be known.

It has been found that in the present invention, when white noise is being injected by noise generator 50 and when equalization filters 130, 230, 330 and 430 are in use, the receiver output signals must be sampled at a rate no less than the equalization bandwidth $B_e$, for I-Q sampling, and no less than twice $B_e$ for real sampling. If this were not done, the result would be frequency aliasing of at least two different frequencies which would likely have different imbalances in the analog hardware employed in the invention. The length of the equalization filters employed in system 5 must span $2T_e$ at the sample rate which is greater than or equal to $B_e$.

Figure 2:
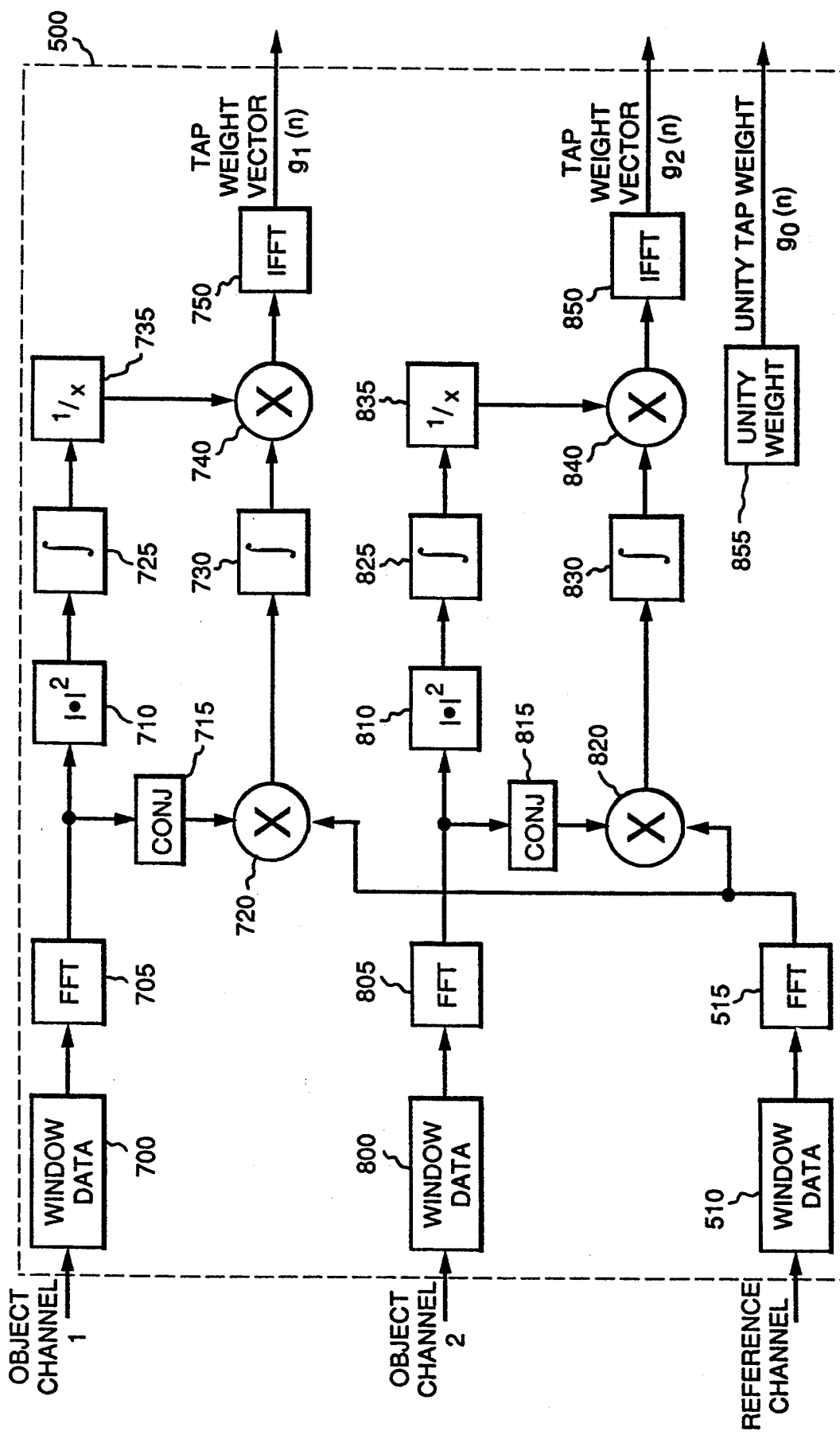
FIG. 2 is a block diagram of the channel match processor employed in the communication system of FIG. 1.

A block diagram of channel processor 500 is shown in FIG. 2. For simplicity, the portion of processor 500 which is coupled to object channel M is omitted in FIG. 2 and only the portions of processor 500 which operate on object channel 1, object channel 2 and reference channel 0 are shown. As discussed above, processor 500 calculates the respective equalizing filter tap weight vectors which are employed in equalizing filters 130, 230, 330 and 430 to equalize the corresponding channels. While white noise is being injected into object channel 1, object channel 2 (and any other object channels) and reference channel 0, the output signal of each channel is sampled by A to D converters 120, 220 and 420, respectively, shown in FIG. 1.

In each channel, the resultant output signal samples are divided into subsequences. This step of generating output sample subsequences for each channel's A/D converter output signal is referred to as windowing and is indicated in FIG. 2 at windowing blocks 510, 700 and 800 for reference channel 0, object channel 1 and object channel 2, respectively. This windowing is synchronized in all channels such that samples taken at the same instant in each of the channels will occupy the same position in their respective windows. A window taken for one channel thus contains a respective subsequence of samples taken during the same time period as corresponding windows in the other channels. The time duration of the windows should be greater than the equalization response time $T_e$, defined earlier. For convenience in processing, the number of samples in each window can be selected to be a power of two.

In one embodiment of the invention, the samples in the windows are weighted at the time of windowing. More particularly, a Hamming window is applied to the samples in each subsequence or window by multiplying the particular samples of the subsequence by a coefficient which is dependent on the position of the sample in the subsequence. Use of the Hamming window in this manner reduces processing artifacts which arise due to the finite length of the data sequence.

For purposes of the subsequent discussion, the sequence of samples obtained from the $i^{th}$ channel in the $j^{th}$ window is designated $Y_i(n,j)$ wherein the reference channel is reference channel 0. Each of the subsequences generated by windowing in the respective channels is transformed from the time domain to the frequency domain by Fast Fourier Transform (FFT) as indicated by Fast Fourier Transform blocks 705, 805 and 515 in FIG. 2. To accomplish this Fourier Transform, a Fast Fourier Transform with a length at least twice the number of samples in the window is used. The windowing process and FFT process are the same in the reference channel and all object channels. The time domain sequence $Y_i(n,j)$ transforms into the frequency domain sequence $Y_i(k,j)$.

In each object channel, two transform domain products are formed, namely the power spectral density estimate in the $i^{th}$ channel and the cross-spectral density in the $i^{th}$ channel. More particularly, the power spectral density estimate $S_i(k,j)$ in the $i^{th}$ channel is formed by taking the magnitude squared of each term in the transform, thus yielding $S_i(k,j) = |Y_i(k,j)|^2$. For example, in object channel 1 the power spectral density estimate $S_1(k,j)$ is formed by taking the magnitude squared of each term of the $Y_1(k,j)$ transform as indicated at magnitude squaring block 710.

The cross-spectral density estimate, $S_{0,i}(k,j)$, between the $i^{th}$ channel and the reference channel is formed by taking the product of the reference channel transform $Y_0(k,j)$, with the conjugate of the object channel transform, $Y_i^*(k,j)$ wherein * indicates the complex conjugate. In other words, $S_{0,i}(k,j) = Y_0(k,j)Y_i^*(k,j)$. For example, the cross-spectral density estimate in object channel 1, $S_{0,1}(k,j)$, is determined by obtaining the product of the reference channel transform, $Y_0(k,j)$ and the complex conjugate of the object channel 1 transform $Y_1^*(k,j)$. The conjugate is taken at conjugate block 715 and the actual product is determined at multiplication block 720, as shown in FIG. 2.

The power spectral density estimate $S_2(k,j)$ and the cross-spectral density estimate $S_{0,2}(k,j)$ for the object channel 2 are determined in a manner directly analogous to the determination in object channel 1 by squaring block 810, conjugate block 815 and multiplication block 820, as shown in FIG. 2.

Several consecutive windows are processed in the manner described above while the spectral density estimates $S_i$ and cross spectral density estimates $S_{0,i}$ are accumulated for each spectral index k. $S_i(k,j)$ is real and non-negative and thus accumulates into positive real numbers. $S_{0,i}(k,j)$ includes a positive real part, much greater than the quadrature part, over the frequency interval where the channels have significant response. The accumulated sums thus derived will be referred to as $S_i(k)$ for the accumulated power spectral density estimate and $S_{0,i}(k)$ for the accumulated cross-spectral density estimate.

For example, in object channel 1 the power spectral density estimates $S_1(k,j)$ are accumulated by integrator 725 to derive $S_1(k)$, while the cross-spectral density estimates $S_{0,1}(k,j)$ are accumulated by integrator 730 to derive $S_{0,1}(k)$. Similarly, in object channel 2 the power spectral density estimates $S_2(k,j)$ are accumulated by integrator 825 to derive $S_2(k)$ while the cross-spectral density estimates $S_{0,2}(k,j)$ are accumulated by integrator 830 to derive $S_{0,2}(k)$.

The accuracy of calibration provided by the subject invention theoretically continues to improve in proportion to the window size times the number of windows. The length of the channel impulse response places a lower bound on the window size. For any application, it will be appreciated that the number of windows selected for use will be a trade-off between the desired accuracy and the time available for the equalization data collection. In testing, the number of windows was varied upward from 8 to 512 while calibration improvements were noted.

After completion of the data collection and processing described above in each of the object channels, a correlation ratio $G_i(k)$ is formed in the frequency domain by dividing the accumulated spectral estimate $S_i(k)$ by the accumulated cross spectral estimate $S_{0,i}(k)$. In object is channel 1 this is performed by division block 735 operating in combination with multiplier block 740, for example. In object channel 2 this is performed by division block 835 operating in combination with multiplier block 840, for example.

More specifically, it has been found in actual practice that dividing $S_{0,i}(k)$ by $S_i(k)$ to find $G_i(k)$ at blocks 735/740 and 835/840 results in magnifying noisy components of $S_{0,i}(k)$ for those values of k for which $S_i(k)$ is very small. To lessen this undesirable effect, a threshold is applied to $S_i(k)$. More particularly, for those k for which $S_i(k)$ exceeds the threshold, the above dividing step is permitted to proceed. However, for those $S_i(k)$ which fall below the predetermined threshold, $G_i(k)$ is set to unity. This occurs when the sampling rate is greater than the two-sided channel bandwidth. The affected values of k are those which correspond to frequencies outside the channel bandwidth. The unity value assigned to $G_i(k)$ results in an equalization vector which produces no correction at that frequency.

In one embodiment of the invention, setting the threshold at 40 dB below the magnitude of the largest $S_i(k)$ produced acceptable results. In this manner, those $S_i(k)$ values which contribute significantly to the aforementioned noise problem are eliminated.

Once derived for a particular object channel, the correlation ratio $G_i(k)$ is inverse transformed back to the time domain, thus yielding $g_i(n)$ which is the set of tap weights which equalize the $i^{th}$ object channel to the reference channel. A different set of tap weights or weight vector is derived for each equalization filter to equalize the corresponding channel with respect to the reference channel. In other words, a different weight vector is provided for each channel to achieve equalization. For example in object channel 1, $g_1(n)$ is derived by inverse Fast Fourier transforming the correlation ratio $G_1(k)$ at inverse Fourier transform block 750 to yield $g_1(n)$, the set of tap weights or weight vector for channel 1. In object channel 2, $g_2(n)$ is derived by inverse Fast Fourier transforming the correlation ratio $G_2(k)$ at inverse Fourier transform block 850 to yield $g_2(n)$, the set of tap weights or weight vector for channel 2. A predetermined tap weight vector $g_0(k)$ is provided by unity tap weight circuit 855 for use by the equalization filter in reference channel 0 as described in more detail below.

Once the weight vectors $g_i(n)$ have been derived for the respective channels in the manner described above, the weight vectors are supplied to the respective equalization filter inputs 130A, 230A, 330A and 430A, shown in FIG. 1. The weight vectors are stored in the respective equalization filters and are used during system operation to achieve equalized channels by causing the filters to assume appropriate characteristics specified by the weight vectors. The equalization filter for the reference channel, namely filter 430, is supplied with a predetermined tap weight vector. Since each object channel is being equalized to match the reference channel, the reference channel weight vector is all zeros except for a unity-valued tap weight at the position which corresponds to the tap indexed 0 in the object channels. This results in no change to the spectral characteristics of the reference channel, providing only a time-alignment with the equalized object channels.

It should be understood that reference channel 0 and object channels 1, 2, ... M are all fully operational channels of system 5. In other words, the fact that a particular channel is selected as the reference channel does not preclude usage of such reference channel as a communication channel. Any of the operating channels in this multi-channel communication system can be selected as a reference channel, since the data collection and equalization hardware is the same in each of the channels. This permits reconfiguration of the reference channel assignment if the processor senses unsuitable characteristics in the reference channel, such as channel failure. That is, another channel can be selected as the reference channel if reference channel failure is observed by the processor.

When $G_i(k)$ is inverse Fourier transformed at blocks 750 and 850, the result is $g_i(n)$, for n=0 to N−1, where N is the FFT size. The required tap weights or weight vectors for the respective equalization filters are represented by $g_i(n)$. In actual practice, some reorganization of $g_i(n)$ is needed and a significant portion thereof can be eliminated.

First, $g_i(n)$ is rearranged by relocating terms indexed from N/2 to N−1 to precede n=0, then reindexing them with appropriate negative values of n. Thus, $g_i(N=1)$ becomes $g_i(-1)$ and so forth. In this manner, the tap weights in a particular vector are a contiguous set of weights centered on n=0, and of such a number to cover $2T_e$ at a sample rate of $B_e$. This number is substantially less than N. In one embodiment of the invention, wherein the size of the FFT is N=256 weights, eliminating 160 weights (80 weights from each end of a set or vector of contiguous weights) resulted in the remaining 96 weights at the center of the vector yielding acceptable results.

Figure 3:
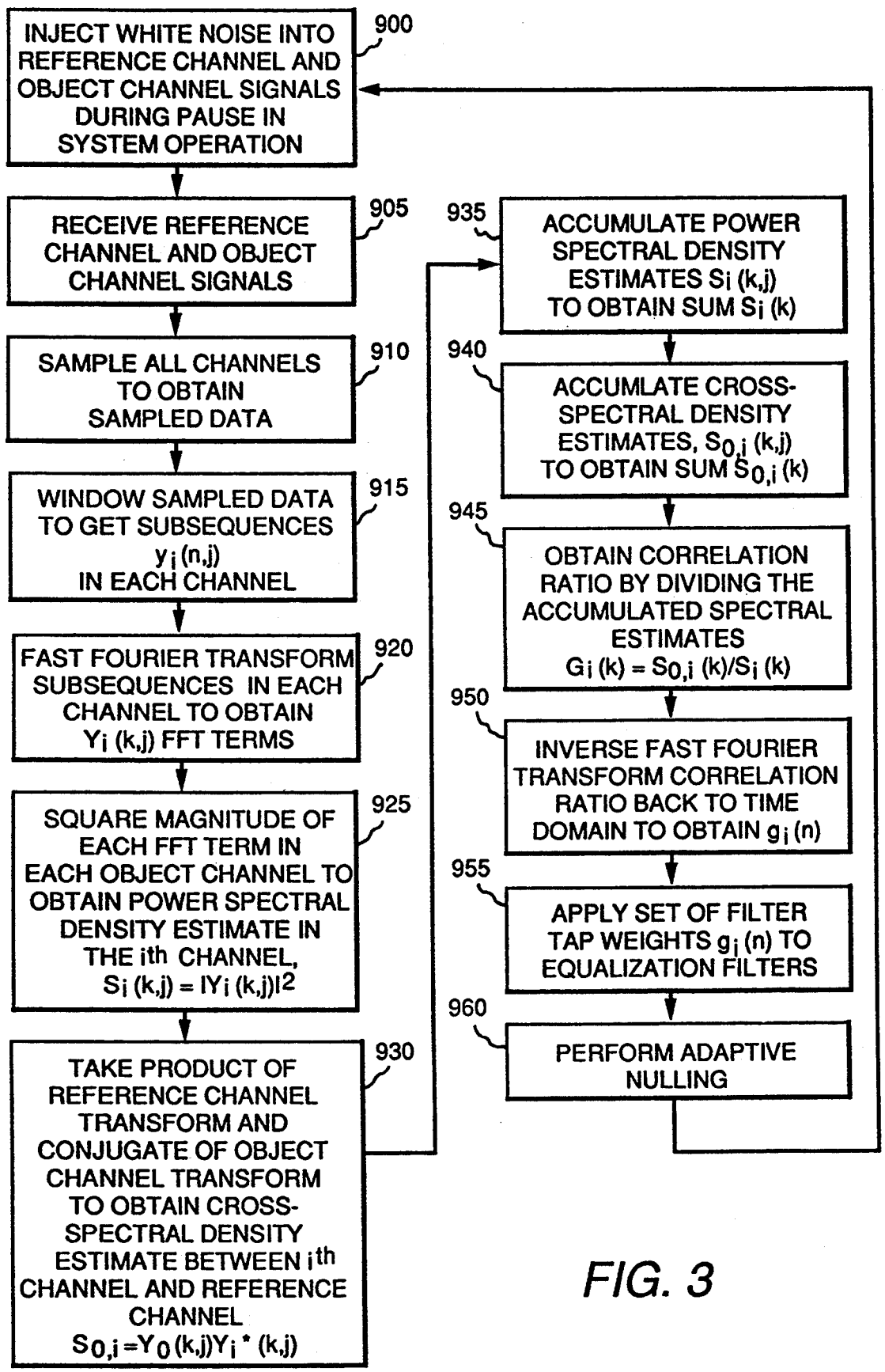
FIG. 3 is a flow chart depicting the method of the present invention.

FIG. 3 is a flow chart which depicts the method of the present invention. In accordance with the method, white noise is injected into the reference channel and the object channels as per step 900. The resultant reference channel signal and object channel signals are then received at step 905. All channels are sampled at step 910 to obtain sampled data. The resultant sampled data is then windowed to obtain subsequences $y_i(n, j)$ in each channel as per step 915. At step 920, the Fast Fourier Transform of the subsequences is derived in each channel to obtain $y_i(k,j)$ FFT terms. The magnitude of each FFT term in each object channel is then squared to obtain the power spectral density estimate in the $i^{th}$ channel, namely, $S_i(k,j)=|Y_i(k,j)|^2$ as per step 925. The product of the reference channel transform and the complex conjugate of the object channel transform is then taken at step 930 to obtain the cross-spectral density estimate between the with channel and the reference channel, namely, $S_{0,i}=Y_0(k,j)Y_i^*(k,j)$.

The power spectral density estimates $S_i(k,j)$ are accumulated on a per channel basis at step 935 to obtain the sums $S_i(k)$. The cross-spectral density estimates, $S_{0,i}(k,j)$ are accumulated on a per channel basis at step 940 to obtain the sums $S_{0,i}(k)$. The correlation ratio $G_i(k)$ is obtained at step 945 by dividing the accumulated spectral estimates to obtain $G_i(k)=S_{0,i}(k)/S_i(k)$. The inverse Fast Fourier Transform of the correlation ratio is than taken at step 950 to obtain the time domain counterpart thereof, namely $g_i(n)$. In accordance with the method of the invention, $g_i(n)$ is the set of filter tap weights (tap weight vectors) which equalize the respective channels of the system when applied to equalization filters 130, 230 and 330 (FIG. 1). The set of filter weights $g_i(n)$ is applied to the respective equalization filters at step 955 to equalize the channels of the system. Conventional adaptive nulling is then performed at step 960.

During a pause in system operation after performing adaptive nulling, the system returns to step 900 and commences equalization of the system again. Equalization of the channels of the system is thus conducted at predetermined time intervals which are interspersed between times when the system is conducting adaptive nulling. For example, when the method is implemented in a radar system, the equalization method specified in steps 900–960 may be carried out during pauses in radar system operation. In other words, the invention provides a way to calibrate a plurality of channels for subband mismatch, the calibration cycles of which can be performed periodically and time-phased between radar operating dwells. In one embodiment of the invention, with reference to FIG. 1, timing circuit 55 gates switch 60 on to activate noise generator 60 and channel match processor 500 of FIG. 1 during equalization/calibration periods which are interspersed between normal periods of operation of system 5. That is, calibration periods are interspersed between operational periods.

While the above description discloses a multi-channel communication system with equalized channels, it is clear that a method for equalizing the channels of a multi-channel communication system is also disclosed. More particularly, a method for equalizing a reference channel and a plurality of object channels in a communication system is disclosed including the steps of simultaneously injecting a white noise excitation signal into each of the channels, sampling the response of each of the channels to the excitation signal to obtain a plurality of respective channel responses, and determining, from the plurality of channel responses, power spectral density estimates in each of the object channels. The method further includes the steps of determining, from the plurality of channel responses, cross-spectral density estimates in each of the object channels with respect to the reference channel, and dividing the power spectral density estimates by respective cross-spectral density estimates to derive a plurality of correlation ratios which specify a plurality of equalization filter weight vectors. The method further includes the step of filtering the channels using the equalization filter weight vectors determined in the dividing step to equalize the channels, each filter weight vector being applied to a respective channel.

The foregoing describes an apparatus and method for equalizing the channels in a multi-channel electronic system which requires matched phase and amplitude response over significant signal bandwidth among multiple receiving channels. The disclosed technique advantageously does not depend on time intensive matrix inversion techniques. The apparatus and method of the invention achieve channel equalization sufficiently fast that the equalization of the channels can be frequently updated while the system is being used. Moreover, the equalization apparatus and method of the invention do not impose a severe drain on computational resources.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. Apparatus for equalizing a reference channel and at least one object channel in a communication system comprising:
   a reference channel receiver for receiving said reference channel;
   an object channel receiver for receiving said object channel;
   a white noise generator coupled to said reference channel receiver and said object channel receiver,
   reference channel sampling means, coupled to said reference channel receiver to produce reference channel sampled signals;
   object channel sampling means, coupled to said object channel receiver to produce object channel sampled signals;
   power spectral density estimate determining means, coupled to said object channel sampling means, for determining power spectral density estimates from said object channel sampled signals;
   cross-spectral density estimate determining means, coupled to said reference channel sampling means and said object channel sampling means, for determining cross-spectral density estimates in said object channel with respect to said reference channel from said reference channel sampled signals and said object channel sampled signals;
   dividing means, coupled to said power spectral density estimate determining means and said cross-spectral density estimate determining means, for dividing said power spectral density estimates by said cross-spectral density estimates to derive a correlation ratio which specifies an equalization filter weight vector, and
   first equalization filtering means, situated in said object channel, for filtering said object channel as specified by said equalization filter weight vector to equalize said object channel with respect to said reference channel.

2. The apparatus of claim 1 further comprising second equalization filter means, situated in said reference channel, for filtering said reference channel and to which a unity tap weight vector is applied.

3. The apparatus of claim 1 further comprising reference channel windowing means, coupled to said reference channel sampling means, for windowing said reference channel sampled signals to produce reference channel windowed subsequences.

4. The apparatus of claim 3 further comprising object channel windowing means, coupled to said object channel sampling means, for windowing said object channel sampled signals to produce object channel windowed subsequences.

5. The apparatus of claim 4 further comprising reference channel Fast Fourier Transform converting means, coupled to said reference channel windowing means, for converting said reference channel windowed subsequences from a time domain to a frequency domain.

6. The apparatus of claim 5 further comprising object channel Fast Fourier Transform converting means, coupled to said object channel windowing means, for converting said object channel windowed subsequences from the time domain to the frequency domain.

7. The apparatus of claim 6 further comprising a first accumulator for accumulating said power spectral density estimates.

8. The apparatus of claim 7 further comprising a second accumulator for accumulating said cross-spectral density estimates.

9. The apparatus of claim 8 further comprising an inverse Fast Fourier Transform converting means, coupled to said dividing means, for converting the correlation ratio derived by said dividing means from the frequency domain to the time domain to obtain said equalization filter weight vector.

10. The apparatus of claim 9 wherein said reference channel sampling means comprises a first analog to digital converter and said object channel sampling means comprises a second analog to digital converter.

11. Apparatus for equalizing a reference channel and a plurality of object channels in a communication system comprising:

a reference channel receiver for receiving said reference channel;

a plurality of object channel receivers for receiving said object channels;

a noise generator, coupled to said reference channel receiver and said object channel receivers, for simultaneously injecting a white noise excitation signal into said reference channel receiver and said object channel receivers;

a plurality of sampling means respectively coupled to said channel receivers, for sampling each of said channels to obtain sampled signals for each of said channels;

a plurality of power spectral density estimate determining means respectively coupled to said sampling means in said object channels, for determining power spectral density estimates in each of said object channels from said sampled signals;

a plurality of cross-spectral density estimate determining means respectively coupled to said sampling means in said object channels and further coupled to said sampling means in said reference channel, for determining cross-spectral density estimates in each of said object channels with respect to said reference channel from said sampled signals;

a plurality of dividing means coupled to respective spectral density estimate determining means and cross-spectral density estimate determining means, for dividing said power spectral density estimates by said cross-spectral density estimates to derive a plurality of correlation ratios which respectively specify an equalization filter weight vector for each object channel, and a plurality of equalization filtering means, respectively situated in each of said channels, for filtering each of said channels using the equalization filter weight vectors determined by said plurality of dividing means to equalize said object channels with respect to said reference channel.

12. The apparatus of claim 11 further comprising unity tap weight vector means, coupled to the equalization filtering means in said reference channel, for applying a unity tap weight vector to the equalization filtering means in said reference channel.

13. The apparatus of claim 11 further comprising a plurality of windowing means, coupled respectively to said plurality of sampling means, for windowing the sampled signals in each of said channels to produce respective windowed subsequences in each of said channels.

14. The apparatus of claim 13 further comprising a plurality of Fast Fourier Transform converting means, respectively coupled to said plurality of windowing means, for converting said windowed subsequences from a time domain to a frequency domain.

15. The apparatus of claim 14 wherein each of said object channels includes an accumulator for accumulating said power spectral density estimates.

16. The apparatus of claim 15 wherein each of said object channels includes a second accumulator for accumulating said cross-spectral density estimates.

17. The apparatus of claim 16 further comprising a plurality of inverse Fast Fourier Transform converting means, respectively coupled to said plurality of dividing means, for converting the correlation ratio derived by each of said dividing means from the frequency domain to the time domain to obtain said equalization filter weight vectors.

18. A method for equalizing a reference channel and a plurality of object channels in a communication system comprising the steps of:

simultaneously injecting a white noise excitation signal into each of said channels;

sampling the response of each of said channels to the excitation signal to obtain a plurality of respective channel responses;

determining, from said plurality of channel responses, power spectral density estimates in each of said object channels;

determining, from said plurality of channel responses, cross-spectral density estimates in each of said object channels with respect to said reference channel;

dividing said power spectral density estimates by respective cross-spectral density estimates to derive a plurality of correlation ratios which specify a plurality of equalization filter weight vectors for each respective one of said object channels;

filtering said object channels using the respective equalization weight vectors determined in the dividing step to equalize said object channels, each filter weight vector being applied to a respective object channel, and filtering said reference channel using a unity tap weight vector.

19. The method of claim 18 further comprising the step of windowing each of said plurality of channel responses to produce windowed subsequences.

20. The method of claim 19 further comprising the step of converting said windowed subsequences from a time domain to a frequency domain.

21. The method of claim 20 further comprising the steps of:

accumulating said power spectral density estimates in each of said object channels prior to said dividing step, and accumulating said cross-spectral density estimates in each of said object channels prior to said dividing step.

22. The method of claim 21 further comprising the step of converting the correlation ratios derived in said dividing step from the frequency domain to the time domain to obtain said plurality of equalization filter weight vectors.

23. A method for equalizing a plurality of channels in a communication system, said channels including a reference channel and at least one object channel, said method comprising the steps of:

simultaneously injecting a white noise excitation signal into said reference channel and said object channel;

receiving signals on said reference channel and object channel thus respectively producing a reference channel received signal and an object channel received signal;

sampling said reference channel received signal and said object channel received signal to produce a sampled reference channel signal and a sampled object channel signal;

windowing said sampled reference channel signal and said sampled object channel signal to respectively produce a plurality of sampled reference channel subsequences and a plurality of sampled object channel subsequences;

transforming said plurality of sampled reference channel subsequences and said plurality of sampled object channel subsequences into a frequency domain;

determining, for said object channel, power spectral density estimates for said sample reference channel subsequences;

determining, for said object channel, cross-spectral density estimates between said sampled object channel subsequences and said sampled reference channel subsequences;

accumulating the power spectral density estimates for said object channel for several consecutive subsequences to produce an accumulated power spectral density estimate;

accumulating the cross-spectral density estimates for said object channel for several consecutive subsequences to produce an accumulated cross-spectral density estimate;

dividing the accumulated power spectral density estimates by the accumulated cross-spectral density estimates to obtain a correlation ratio, and transforming said correlation ratio into a time domain to produce a tap weight vector for use in an equalization filter in said object channel to equalize said object channel with respect to said reference channel.

* * * * *